E. A. HAWTHORNE & J. H. GEORGE.
REINFORCED BATTERY JAR.
APPLICATION FILED JULY 3, 1914.

1,195,217.

Patented Aug. 22, 1916.

Witnesses:
Carl L. Choate.
Horace A. Crossman.

Inventors:
Ellsworth A. Hawthorne,
John H. George,

UNITED STATES PATENT OFFICE.

ELLSWORTH A. HAWTHORNE AND JOHN H. GEORGE, OF BRIDGEPORT, CONNECTICUT; SAID GEORGE ASSIGNOR TO SAID HAWTHORNE.

REINFORCED BATTERY-JAR.

1,195,217.  Specification of Letters Patent.  Patented Aug. 22, 1916.

Application filed July 3, 1914. Serial No. 848,878.

*To all whom it may concern:*

Be it known that we, ELLSWORTH A. HAWTHORNE, a citizen of the United States, and JOHN H. GEORGE, a subject of the King of England, both residents of Bridgeport, Fairfield county, Connecticut, have invented an Improvement in Reinforced Battery-Jars, of which the following description, in connection with the accompanying drawings, is a specification, like characters on the drawings representing like parts.

This invention relates to battery jars, and is more especially concerned with a reinforced battery jar, and a method of producing the same.

Our invention will be best understood by reference to the following specification, when taken in connection with the accompanying drawings of one specific embodiment thereof, while its scope will be more particularly pointed out in the accompanying claims.

Figure 1:
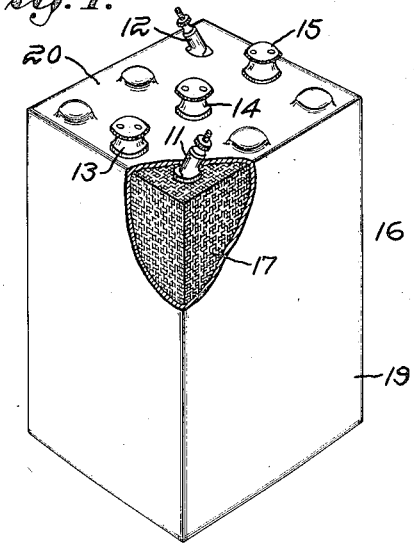
Figure 2:
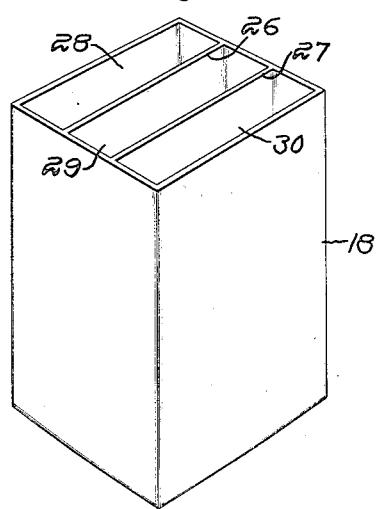
Figure 3:
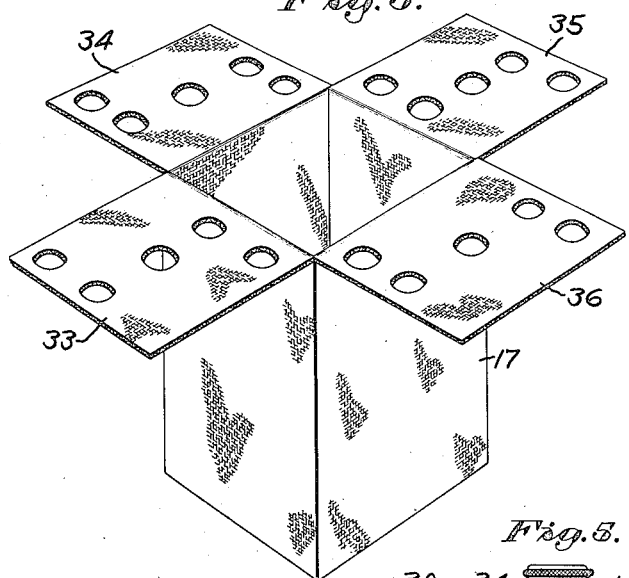
Figure 4:
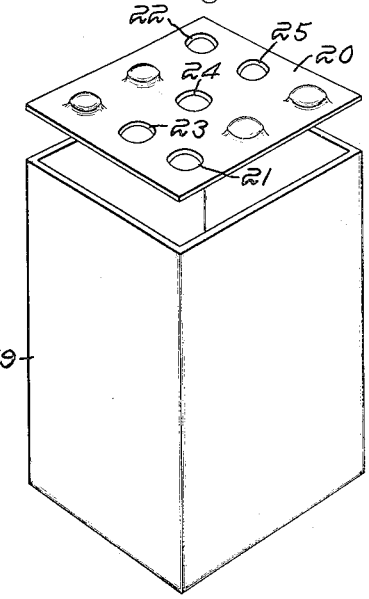
Figure 5:
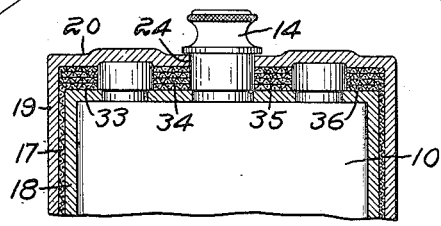
Figure 6:
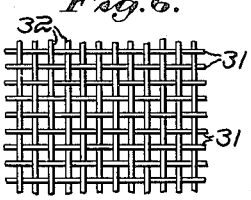
Figure 7:
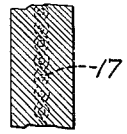

In the drawings: Figure 1 is a perspective view of a battery and re-inforced battery jar therefor, embodying our invention; Fig. 2 is a perspective view of the inner shell or jar proper; Fig. 3 is a perspective view of one form of re-inforcing means; Fig. 4 is a perspective view of the outer shell and its cover; Fig. 5 is a vertical, sectional view of the upper portion of the battery and its jar; Fig. 6 is a detail elevation of a portion of one form of re-inforcing means, consisting of woven fabric; and Fig. 7 is a detail, sectional view of a portion of one of the walls of the battery jar, showing the re-inforcing means embedded therein.

Referring to the drawings, and to the embodiment of our invention which we have selected for illustration, we have there shown a battery 10, which may be and preferably is a secondary, or storage battery, and is provided as usual with terminals 11 and 12, as well as one or more vents, herein three, designated by the numerals 13, 14 and 15, whose purpose is to permit the escape of the fumes arising from the acid. We deem it unnecessary herein to show the customary battery plates, since they form no essential part of our present invention.

A battery jar designated generally by the numeral 16, as herein constructed, has incorporated therein re-inforcing means 17 for enabling it to withstand shocks, which might otherwise fracture or even totally destroy the same. This re-inforcement may be wrapped about, or united with, or embedded in the walls of, the battery jar in any appropriate manner, but we prefer to form the battery jar of an inner shell 18 and an outer shell 19, between which the re-inforcement is interposed. As herein shown, the outer shell is provided with a suitable cover 20, having apertures 21 and 22 for the terminals 11 and 12, respectively, and apertures 23, 24 and 25, to receive the vents 13, 14 and 15, respectively. It is desirable that the battery jar, or at least the internal walls of the same, should be made of suitable acid-resisting material, such for example as glass or vulcanite, the latter being preferred, as it is less fragile than glass, has a certain degree of elasticity, and is less likely to become fractured. To this end, therefore, the inner shell 18 will by preference be made of vulcanite, molded, pressed, or otherwise shaped, to form a container for the battery elements, and is herein shown as being provided with partitions 26 and 27, dividing its interior into three compartments 28, 29 and 30, to receive the battery plates. Preferably, the outer shell 19 will also be formed of vulcanite, molded, pressed, or otherwise shaped to form a container for the inner shell, the two being of such dimensions that when assembled, they are separated by a slight space to receive the re-inforcement 17.

The re-inforcement may be of any appropriate character, but is herein in the form of a jacket, preferably composed of filaments of suitable material, woven, plaited, interlaced, or otherwise united with one another. As herein shown, the re-inforcement is made up of a set of filaments, or strands 31, and a set of similar filaments or strands 32, woven to form a fabric, which preferably has such a coarse mesh that when introduced between the inner and outer shells, the latter may be united with each other through the openings in the fabric. The re-inforcing strands or filaments might be of any suitable material, but the best material now known to us for this purpose is a fibro-form material, commercially known as "ramie," which possesses great strength and durability.

The re-inforcement may be woven seamless, or may be made up of one or more pieces joined in any suitable manner, to form a jacket which may be drawn onto the previously formed inner shell 18 and closely conform to its external surface. Preferably, also, this jacket will be provided with one or more, herein four, flaps 33, 34, 35 and 36, each having an area approximately equal to the area of the opening in the jacket, and adapted to be folded so as to overlie one another, and overlie the top of the battery when the latter is inserted in the inner shell. Each of these flaps will, of course, be perforated to correspond with the perforations 21, 22, 23 and 24 of the cover 20, so that all of the perforations will register with one another in the proper manner to accommodate the battery terminals and vents.

The first step in producing the battery jar according to our preferred method is to mold, press, or otherwise form, the inner and outer shells 19, the latter with its separate cover 20, and prepare the re-inforcement 17 of the proper size to occupy the space between the shells. The re-inforcement is then drawn onto the inner shell 18, and then introduced into the outer shell 19, or the re-inforcement may be first inserted in the outer shell 19, and the inner shell 18 afterward introduced. We prefer, however, to apply the re-inforcement to the inner shell, and then introduce the latter into the outer shell.

If desired, the next step, which consists in uniting the inner and outer shells in intimate relation with each other, may take place at this time, but we prefer to assemble the battery elements in their proper places in the inner shell and then fold the flaps over the top of the battery, afterward placing the cover 20 upon the structure thus assembled.

The parts of the battery container, as thus assembled, may then be united with each other, and with the re-inforcement, to form a one-piece, re-inforced structure. The whole may be unified by fusing, softening, or otherwise treating, the inner and outer shells and the cap, as for example by subjecting them to the action of heat, so that the vulcanite, when thus softened, will flow through the openings in the re-inforcing fabric, and the inner and outer shells will become actually as one piece, as will be readily understood from an examination of Fig. 7. The parts may be subjected to pressure, either during or immediately after the operation of heating, if desired, to force them into intimate contact. The resulting structure, when cooled, constitutes an integral container for the battery, possessing great strength to enable it to withstand shocks to which it may be subjected, as for example where it is carried by a vehicle. Even though it should sustain so great a shock as to actually fracture a portion of its walls, yet the re-inforcement will prevent instant spilling of the acid, as would otherwise take place.

While we have herein shown and described one specific form or embodiment of our invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described our invention, what we claim and desire by Letters Patent to procure is:—

1. The combination with a battery jar of a covering inclosing said jar and having side and bottom walls, flaps carried by the side walls each of substantially the same size as the top of the jar, a cover for the jar the flaps overlying the cover and one another, the cover and flaps having registering apertures for the passage of the battery terminals.

2. The combination with a battery jar of a textile reinforcement inclosing the bottom and sides of the jar and united therewith, the reinforcement carrying flaps adapted to overlie the top of the jar.

3. A battery container comprising an inner shell or jar proper, a reinforcement surrounding the same and an outer shell or covering surrounding the reinforcement, the layers mentioned being intimately united, one of the walls of the container being reinforced by a plurality of independent laminæ of reinforcing material, each lamination being an extension of the reinforcing material in other walls.

4. A battery jar of caoutchouc-like material reinforced by fibrous textile intimately connected to and united therewith.

5. A battery jar of caoutchouc-like material, a fibrous textile reinforcement united therewith, a cover for the jar and extensions of the reinforcement securing the cover.

6. The method of making a reinforced battery jar which comprises the following steps:—first, forming an inner shell and an outer shell of inherently stable form; second, interposing between said shells reinforcing means; and third, fusibly uniting said shells to said reinforcing means.

7. The method of producing a reinforced battery jar which consists in forming inner and outer shells of inherently stable form, then interposing between said shells a reticulated reinforcing means, and finally causing said shells to unite with each other through the openings in said reinforcing means.

8. The method of producing a reinforced battery jar which consists in forming inner and outer shells of inherently stable form, then interposing between said shells a reticulated reinforcing means, and finally subjecting said shells to the action of heat to cause them to unite with each said reinforcing means.

In testimony whereof, we have signed our names to this specification in the presence of two subscribing witnesses.

ELLSWORTH A. HAWTHORNE.
JOHN H. GEORGE.

Witnesses:
E. HORACE HAWTHORNE,
E. STEWART HAWTHORNE.